(12) United States Patent
Evans et al.

(10) Patent No.: US 11,623,295 B2
(45) Date of Patent: *Apr. 11, 2023

(54) RUGGEDIZED CASING FOR A PORTABLE WELDING SYSTEM

(71) Applicant: The ESAB Group Inc., Florence, SC (US)

(72) Inventors: Daryll Scott Evans, Winchester, VA (US); Mark Lowther, Warrington (GB); Cristiano Magalhaes Campos Ferreira, Belo Horizonte (BR)

(73) Assignee: The ESAB Group Inc., North Bethesda, MD (US)

( * ) Notice: Subject to any disclaimer, the term of this patent is extended or adjusted under 35 U.S.C. 154(b) by 477 days.

This patent is subject to a terminal disclaimer.

(21) Appl. No.: 16/655,573

(22) Filed: Oct. 17, 2019

(65) Prior Publication Data

US 2020/0047277 A1 Feb. 13, 2020

Related U.S. Application Data

(63) Continuation of application No. 14/933,214, filed on Nov. 5, 2015, now Pat. No. 10,478,912.

(Continued)

(51) Int. Cl.
*B23K 9/32* (2006.01)
*B23K 37/02* (2006.01)

(52) U.S. Cl.
CPC ............ *B23K 9/32* (2013.01); *B23K 37/0294* (2013.01)

(58) Field of Classification Search
CPC ...... B23K 37/00; B23K 37/0294; B23K 9/32; B62B 3/10; B62B 3/16; F02B 63/04; F16M 3/00
See application file for complete search history.

(56) References Cited

U.S. PATENT DOCUMENTS 6,758,169 B2 7/2004 Suzuki et al.
D501,182 S 1/2005 Buck
(Continued)

FOREIGN PATENT DOCUMENTS

CN 2182022 Y 11/1994
CN 2254388 Y 5/1997
(Continued)

OTHER PUBLICATIONS

Chinese Office Action for Application No. 201510750320.3 dated Aug. 29, 2017.
(Continued)

*Primary Examiner* — Tu B Hoang
*Assistant Examiner* — Vy T Nguyen
(74) *Attorney, Agent, or Firm* — Edell, Shapiro & Finnan, LLC

(57) ABSTRACT

A portable welding system casing includes front, rear, top and bottom portions. First and second side members can each have a plurality of fastening lug portions. The first and second side members may each have a recess so that the recess of the first side member receives a first perimeter edge of the front, rear, top and bottom portions and the recess of the second side member receives a second perimeter edge of the front, rear, top and bottom portions. A plurality of handle members can be coupled between associated fastening lug portions of the first and second side member. First and second foot members coupled to respective surfaces of the front, rear and bottom portions. The resulting casing has improved structural strength and rigidity.

19 Claims, 18 Drawing Sheets

Related U.S. Application Data

(60) Provisional application No. 62/076,741, filed on Nov. 7, 2014.

(56) References Cited

U.S. PATENT DOCUMENTS

| | | | |
|---|---|---|---|
| 6,917,121 | B2 | 7/2005 | Akimoto et al. |
| D597,485 | S | 8/2009 | Ma |
| D606,102 | S | 12/2009 | Bender et al. |
| D633,443 | S | 3/2011 | Wang et al. |
| 8,328,207 | B2 * | 12/2012 | Hirose .................... F02B 63/04 280/47.131 |
| 8,413,833 | B1 | 4/2013 | Taylor et al. |
| D682,785 | S | 5/2013 | Liebert et al. |
| D699,771 | S | 2/2014 | Barrett |
| 2003/0071465 | A1 | 4/2003 | Sugimoto et al. |
| 2004/0084428 | A1 * | 5/2004 | Cigelske, Jr. ............ B23K 9/32 219/130.1 |
| 2005/0230936 | A1 * | 10/2005 | Van Horn ............ A45C 13/262 280/641 |
| 2005/0258155 | A1 | 11/2005 | DeYoung |
| 2006/0011624 | A1 | 1/2006 | Shih |
| 2006/0124620 | A1 | 6/2006 | Diekmann et al. |
| 2006/0157988 | A1 * | 7/2006 | Mazuka .................. F02B 63/04 290/1 A |
| 2006/0163875 | A1 | 7/2006 | Sugiyama et al. |
| 2006/0214425 | A1 | 9/2006 | Yamamoto et al. |
| 2007/0108767 | A1 * | 5/2007 | Hirose .................... F02B 63/04 290/1 A |
| 2008/0061047 | A1 | 3/2008 | Borowy et al. |
| 2008/0083705 | A1 | 4/2008 | Peters |
| 2008/0149611 | A1 | 6/2008 | Roth et al. |
| 2008/0156783 | A1 | 7/2008 | Vanden Heuvel et al. |
| 2008/0238107 | A1 * | 10/2008 | Yamamoto .............. F02B 63/04 290/1 R |
| 2008/0238221 | A1 | 10/2008 | Yamamoto et al. |
| 2008/0252080 | A1 * | 10/2008 | Xiao ........................ F02B 63/04 123/41.66 |
| 2009/0057285 | A1 | 3/2009 | Bashore et al. |
| 2009/0166345 | A1 | 7/2009 | Enyedy et al. |
| 2009/0322100 | A1 | 12/2009 | Hiranuma et al. |
| 2010/0096286 | A1 | 4/2010 | Ma et al. |
| 2010/0147816 | A1 | 6/2010 | Laitala |
| 2010/0276399 | A1 | 11/2010 | Stanzel |
| 2010/0319986 | A1 * | 12/2010 | Bleau .................... H05K 7/023 174/520 |
| 2011/0163072 | A1 * | 7/2011 | Vogel ................... B23K 9/0956 219/130.33 |
| 2011/0204013 | A1 * | 8/2011 | Lahti .................. B23K 37/0294 211/85.8 |
| 2012/0068041 | A1 | 3/2012 | Flattinger et al. |
| 2014/0042134 | A1 * | 2/2014 | Liebert .................... B62B 3/10 219/130.1 |
| 2014/0374394 | A1 * | 12/2014 | Sigi .................... H05K 7/20909 219/130.1 |

FOREIGN PATENT DOCUMENTS

| | | |
|---|---|---|
| CN | 2616329 Y | 5/2004 |
| CN | 1801579 A | 7/2006 |
| CN | 101280717 A | 10/2008 |
| CN | 101861225 A | 10/2010 |
| CN | 202479672 U | 10/2012 |
| CN | 203221295 U | 10/2013 |
| CN | 203849654 U | 9/2014 |
| EP | 2682923 A2 | 1/2014 |
| EP | 2432617 B1 | 5/2014 |
| WO | 2009029360 A1 | 3/2009 |

OTHER PUBLICATIONS

Chinese Office Action in corresponding Chinese Patent Application No. CN201510750320.3, dated Oct. 24, 2018, 20 pages.

European Search Report dated Mar. 31, 2016 for European Patent Application No. 15190264.0 filed Oct. 16, 2015.

\* cited by examiner

RUGGEDIZED CASING FOR A PORTABLE WELDING SYSTEM

CROSS-REFERENCE TO RELATED APPLICATIONS

This application is a continuation of U.S. patent application Ser. No. 14/933,214, filed Nov. 5, 2015, and entitled "Ruggedized Casing for a Portable Welding System," which claims priority to U.S. Provisional Patent Application No. 62/076,741, filed Nov. 7, 2014. The entire contents of both of these applications are incorporated by reference herein.

FIELD OF THE DISCLOSURE

The disclosure generally relates to welding equipment, and more particularly to an improved ruggedized casing arrangement for a portable welding system.

BACKGROUND OF THE DISCLOSURE

Portable welding systems are known, and often incorporate a welding power supply and related mechanisms (e.g., wire feeder, wire spool) in a portable case. Such portable welding systems find use in applications where it is not practical or convenient to send a work-piece to a shop for repair or fabrication. Examples of applications for such portable welding systems include petroleum and chemical fabrication, shipboard installation and repair, and the like. As such, known portable welding systems may be relatively light weight to enable a user is able to lift and carry the system to the work site. Because of the portability and flexibility of these welding systems they have found widespread use and popularity.

One issue with known portable welders is that they are often not sufficiently rugged to withstand harsh treatment that can often occur during transport and use. Due to the nature of the environment in which such portable welders are used, they may become damaged and may require repair at shorter than desired intervals. Another issue with prior portable welders is that they may not be designed to be sufficiently easy to grasp, lifted, and carried by a user. In addition, known portable welders may not be designed in a manner that enables easy repair/replacement of individual pieces or portions of the casing should they become damaged in use.

SUMMARY OF THE DISCLOSURE

Thus, in view of the foregoing, embodiments disclosed herein provide a portable welding system casing that is rugged, is easily transportable between work locations, and which can be easily repaired should it become damaged.

In one approach, a portable welding system casing is disclosed, including front, rear, top and bottom portions. First and second side members can each have a plurality of fastening lug portions. The first and second side members may each have a recess so that the recess of the first side member receives a first perimeter edge of the front, rear, top and bottom portions and the recess of the second side member receives a second perimeter edge of the front, rear, top and bottom portions. A plurality of handle members can be coupled between associated fastening lug portions of the first and second side member. First and second foot members coupled to respective surfaces of the front, rear and bottom portions. The resulting casing has improved structural strength and rigidity.

In another approach, a portable welding system casing is disclosed, including front, rear, top and bottom portions, and first and second side members each having a plurality of fastening lug portions. The first and second side members further each have a recess, wherein the recess of the first side member receives a first perimeter edge of the front, rear, top and bottom portions and the recess of the second side member receives a second perimeter edge of the front, rear, top and bottom portions. The portable welding system casing may further include a plurality of handle members, each of the plurality of handle members coupled between associated fastening lug portions of the first and second side member, wherein at least one handle member of the plurality of handle members is coupled to the front portion of the case, at least one handle member of the plurality of handle members is coupled to the rear portion of the casing, and at least two handle members are positioned at opposite ends of the top portion. The portable welding system casing may further include first and second foot members coupled to respective surfaces of the front, rear and bottom portions.

In another approach, a casing is disclosed, including front, rear, top and bottom portions configured to enclose one or more welding components, and first and second side members each having a plurality of fastening lug portions. The first and second side members further each have a recess, wherein the recess of the first side member receives a first perimeter edge of the front, rear, top and bottom portions and the recess of the second side member receives a second perimeter edge of the front, rear, top and bottom portions. The casing further includes a plurality of handle members, each of the plurality of handle members coupled between associated fastening lug portions of the first and second side member, and first and second foot members coupled to respective surfaces of the front, rear and bottom portions.

BRIEF DESCRIPTION OF THE DRAWINGS

By way of example, a specific embodiment of the disclosed device will now be described, with reference to the accompanying drawings, in which.

Figure 1:
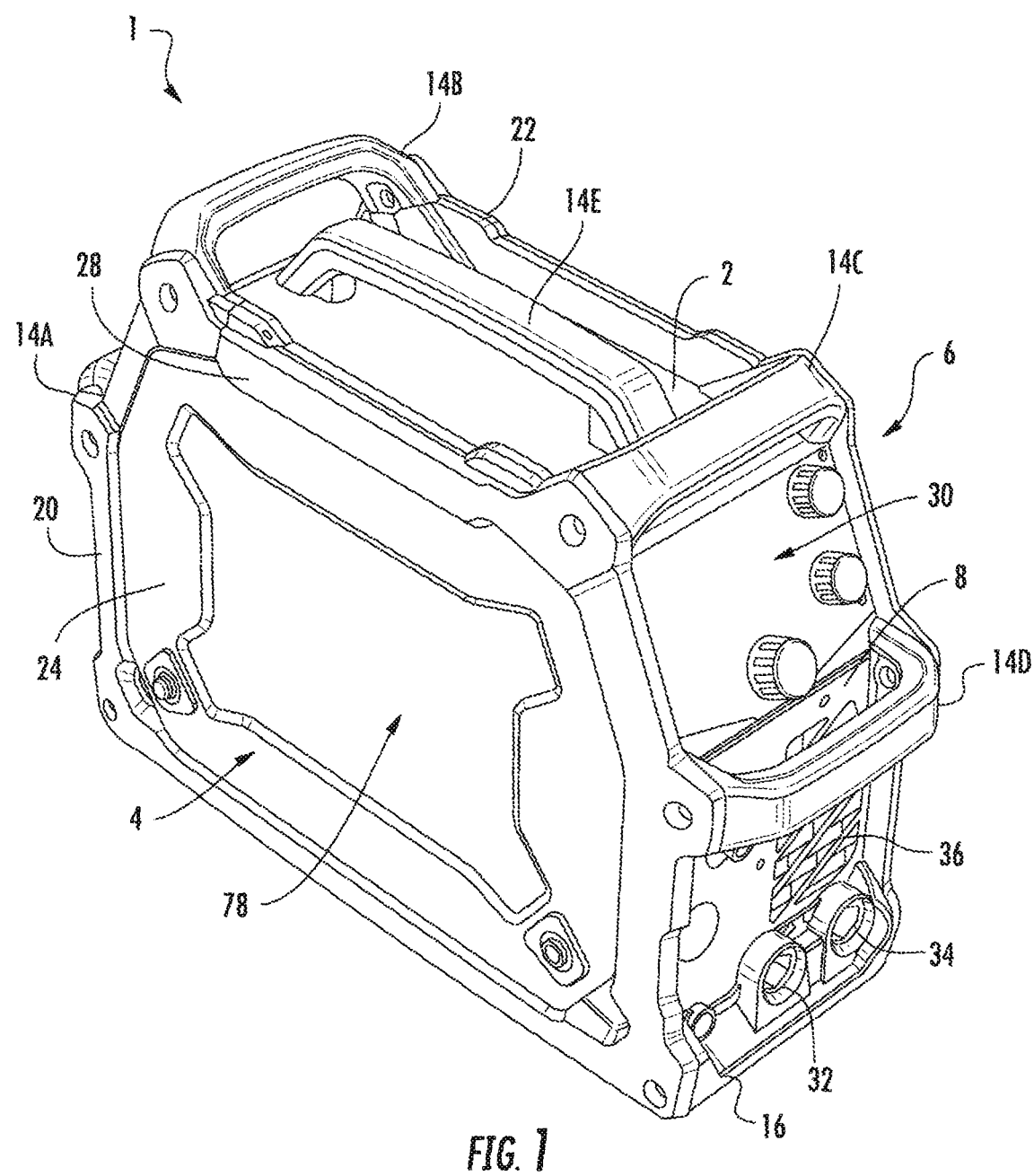
FIG. 1 is an isometric view of an exemplary welding system according to the disclosure.

The drawings are not necessarily to scale. The drawings are merely representations, not intended to portray specific parameters of the disclosure. The drawings are intended to depict exemplary embodiments of the disclosure, and therefore are not be considered as limiting in scope. In the drawings, like numbering represents like elements.

DETAILED DESCRIPTION

An improved welding system casing in accordance with the present disclosure will now be described more fully hereinafter with reference to the accompanying drawings, where embodiments of the system and method are shown. The system may be embodied in many different forms and are not be construed as being limited to the embodiments set forth herein. Instead, these embodiments are provided so this disclosure will be thorough and complete, and will fully convey the scope of the system and method to those skilled in the art.

For the sake of convenience and clarity, terms such as "top," "bottom," "upper," "lower," "vertical," "horizontal," "lateral," and "longitudinal" will be used herein to describe the relative placement and orientation of these components and their constituent parts, with respect to the geometry and orientation of a component of a semiconductor manufacturing device as appearing in the figures. The terminology will include the words specifically mentioned, derivatives thereof, and words of similar import.

As used herein, an element or operation recited in the singular and proceeded with the word "a" or "an" are understood as potentially including plural elements or operations as well. Furthermore, references to "one embodiment" of the present disclosure are not intended to be interpreted as precluding the existence of additional embodiments also incorporating the recited features.

Referring now to FIGS. 1-8, an exemplary portable welding system casing 1 (hereinafter "casing") includes a top portion 2, first and second side portions 4, 6 a front portion 8, a rear portion 10, and a bottom portion 12. A plurality of handle members 14A-E may be coupled to the casing 1 in spaced apart relation about the casing to enable a user to grasp and lift the casing 1 and/or to move the casing to a desired location. As will be described in greater detail later, the handles 14A-E may be positioned at specific locations about the casing 1 so as to provide for ease of handling as well as for protection of one or more aspects of the casing 1.

The casing 1 may also include first and second foot members 16, 18 positioned on the bottom portion 12 of the casing to provide a stable surface for the casing during operation. In some embodiments these first and second foot members 16, 18 may wrap slightly around the front and rear portions 8, 10 in a manner that provides protection for front and rear edges of the casing 1.

The first and second side portions 4, 6 of the casing 1 may include respective first and second side members 20, 22 with first and second plate members 24, 26 coupled thereto. The first and second side members 20, 22 may be used in part to couple the first and second plate members 24, 26 to the top portion 2, front and rear portions 8, 10 and bottom portion 12 to form an enclosed space therein, which can be used to house one or more welding components (not shown) such as a wire feeder, a wire spool, a PCB based control system, thermal management components, and the like.

In some embodiments, the first side member 20 may have a hinge 28 for pivotably connecting the first plate member 24 to the first side member 20, thus enabling a user to access the one or more welding components within the casing by swinging the first plate member 24 out and away from the first side member.

A user interface 30 may be mounted to the front portion 8 of the casing 1 to enable a user to control operational aspects of the one or more welding components within the casing. Welding torch connections 32, 34 may also be provided on the front portion 30 to enable a user to connect a welding torch to the casing 1 to couple with one or more of the welding components housed within the casing. In the illustrated embodiment, these welding torch connections 32, 34 are formed through the first foot member 16, although this is not critical. Front and rear louvers 36, 38 may be provided in the front and rear portions 8, 10 to facilitate the movement of air through the enclosed space of the casing 1.

Figure 3:
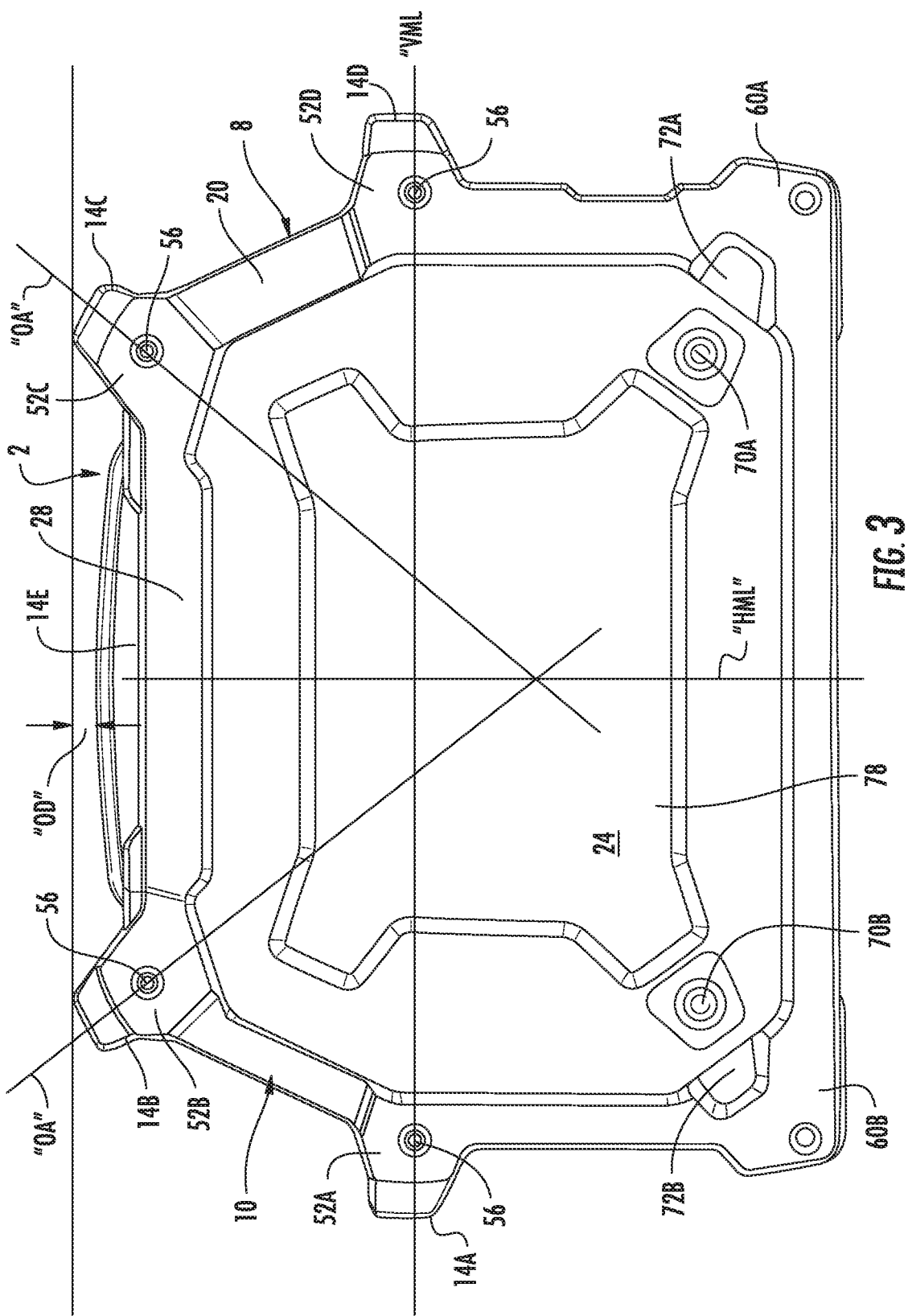
FIG. 3 is a first side view of the welding system of FIG. 1.
Figure 4:
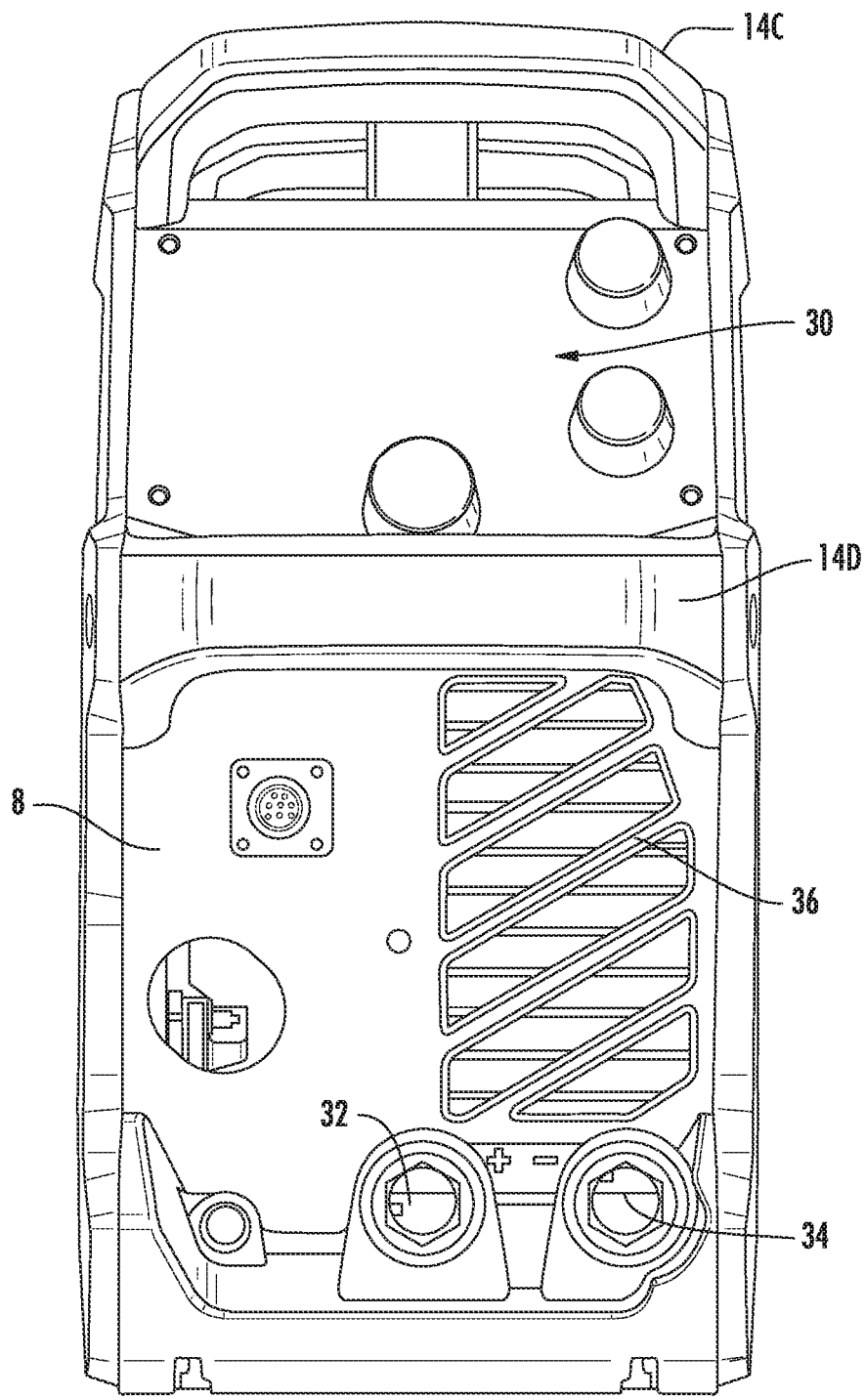
FIG. 4 is a front view of the welding system of FIG. 1.

As can be seen best in FIG. 3, the handle members 14A-E are positioned about the casing 1 to enable easy handling as well as to protect aspects of the casing from damage. First and second handle members 14A, 14B may be associated with the rear portion 10 of the casing 1, while third and fourth handle members 14C, 14D may be associated with the front portion 8 of the casing. A fifth handle member 14E may be positioned on the top portion 2 of the casing 1. In some embodiments, as can be seen, the first through fourth handle members 14A-D are of the same design, while the fifth handle member 14E is an elongated design having a shape that is different from the first through fourth handle members.

The first and fourth handle members 14A, 14D may be positioned at the same vertical position on the rear and front portions 10, 8, respectively, of the casing 1. In general, the first and fourth handle members 14A, 14D are positioned at or near the vertical midline "VML" of the casing 1 to enable easy grasping and lifting of the casing using two hands. The second and third handle members 14B, 14C are positioned at the intersection between the rear and front portions 10, 8, respectively, and the top portion 2. The second and third handle members 14B, 14C can have an angled orientation such that a line drawn through their respective orientation axes "OA" generally intersects the horizontal midline "HML" of the casing 1, thus providing a stable lifting arrangement.

The second and third handle members 14B, 14C and the fifth handle member 14E can be arranged so that a line connecting the upper surfaces of the second and third handle members is offset from an upper surface of the fifth handle member 14E by an offset distance "OD." In this manner, the fifth handle member 14E is recessed below the second and third handle members 14B, 14C. As will be appreciated, this arrangement provides a measure of protection to the fifth handle member 14E. It also enables the casing 1 to be stacked on top of another casing 1 of identical design without the fifth handle member 14E interfering, as can be seen in FIG. 2A. As can best be seen in FIG. 8, the first and second foot members 16, 18 have respective handle engagement recesses 40, 42 formed in a bottom portion of each of the foot members. These handle engagement recesses 40, 42 are shaped to conform to the upper surfaces of the second and third handle members 14B, 14C so that the handle members are received within the handle engagement recesses 40, 42 when one casing, such as the casing 1, is placed on top of another casing, as may be desired for convenient storage and transport of multiple casings. This arrangement provides a stable stacking configuration for multiple casings.

Figure 5:
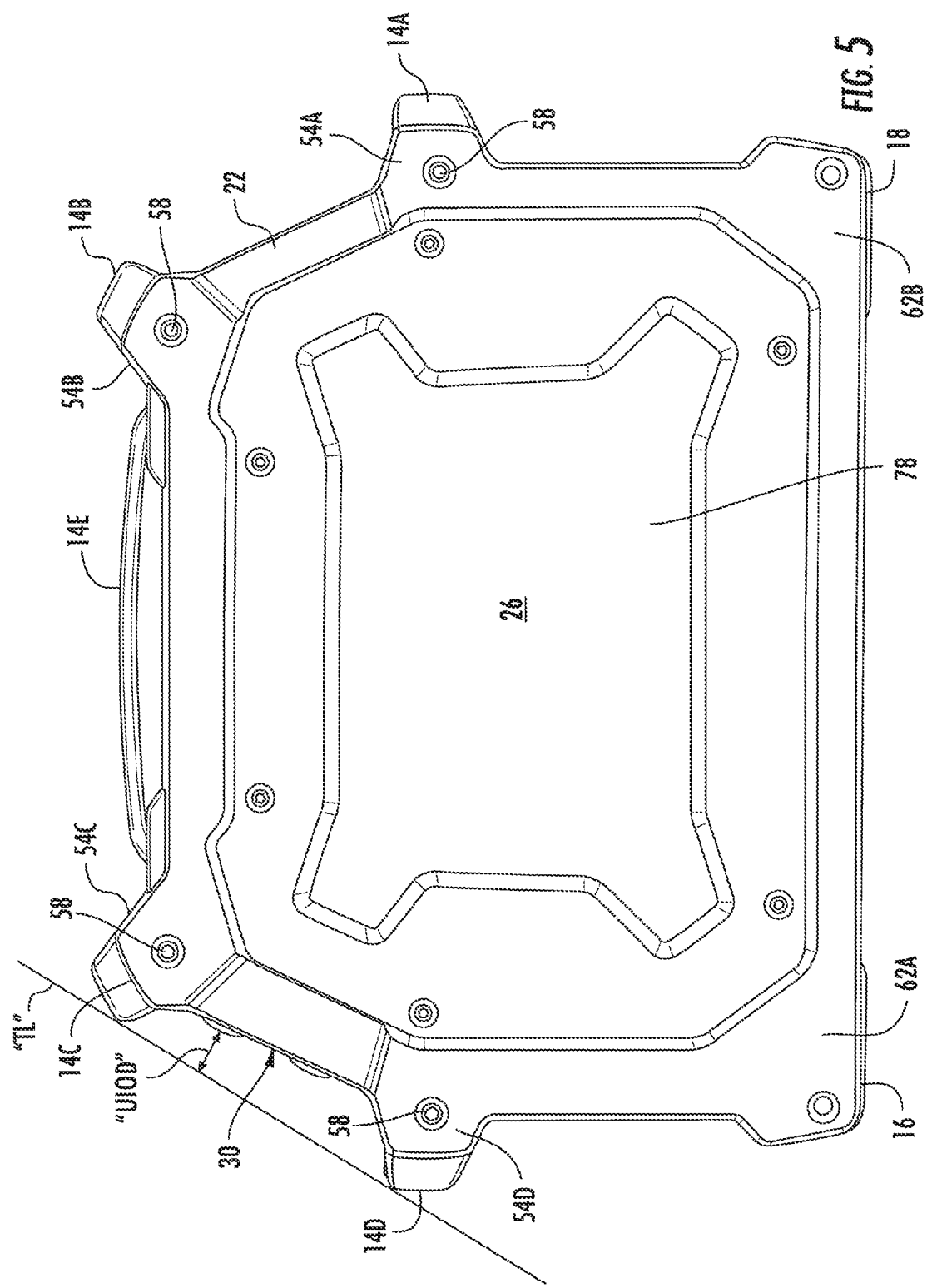
FIG. 5 is a second side view of the welding system of FIG. 1.

As can be seen in FIG. 5, the third and fourth handle members 14C, 14D are positioned so that a tangent line "TL" connecting tangent surfaces of the third and fourth handle members 14C, 14D is offset from elements of the user interface 30 by a user interface offset distance "UIOD." As will be appreciated, this arrangement of third and fourth handle members 14C, 14D can provide protection of the user interface 30 against a variety of impacts that could damage the user interface. The positioning of the third and fourth handle members 14C, 14D, as well as the angle of the user interface 30, can also result in a desired degree of shading of the user interface 30, which may be desired in outdoor sunlit conditions.

As will be appreciated by viewing FIG. 5, the arrangement of the first, second, third and fourth handle members 14A-14D and the first and second foot members 16, 18 may provide a protective perimeter around the casing 1 so that impacts can largely be absorbed by the handle members and the foot members rather than by the top, front, rear, and bottom portions 2, 8, 10, 12 of the casing or the first and second plate members 24, 26. This is an advantage over prior systems which provide no such impact protection. In addition, with the disclosed design, if a handle member or a foot member is damaged due to dropping or other impact, it can be easily removed and replaced without the need to replace larger portions of the casing 1.

Figure 9:
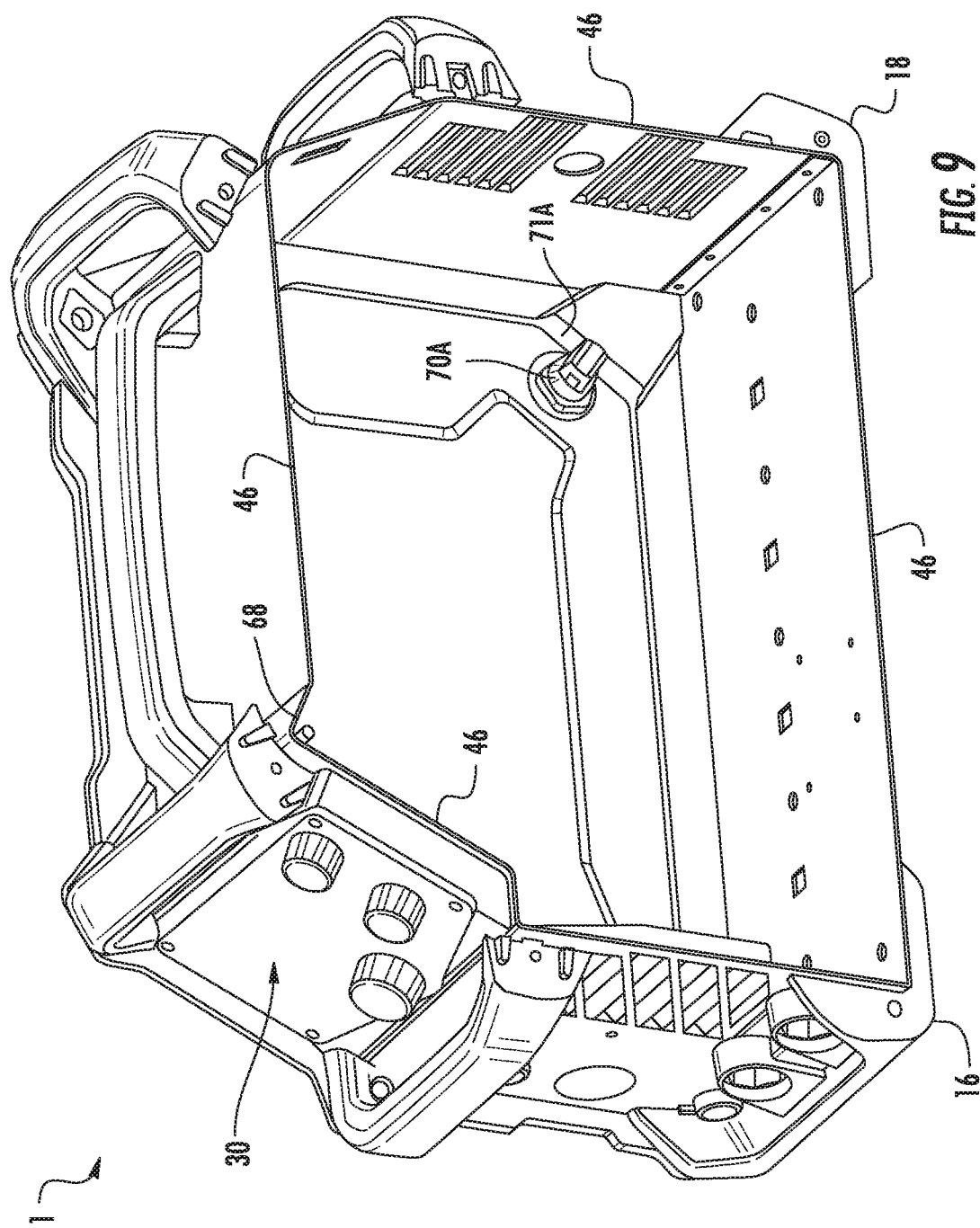
FIG. 9 is a first isometric cutaway view of the welding system of FIG. 1.
Figure 10:
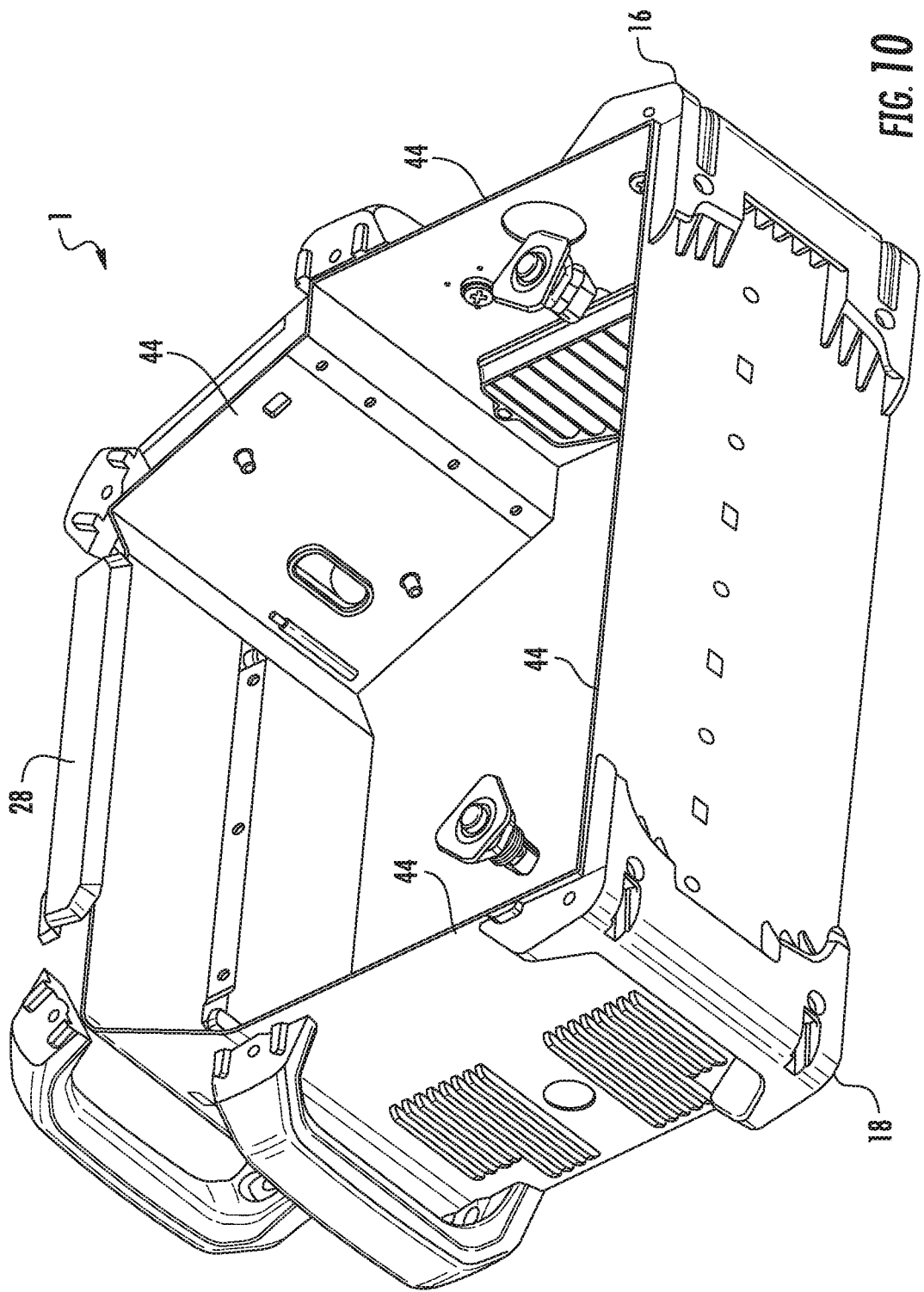
FIG. 10 is a second isometric cutaway view of the welding system of FIG. 1.
Figure 11:
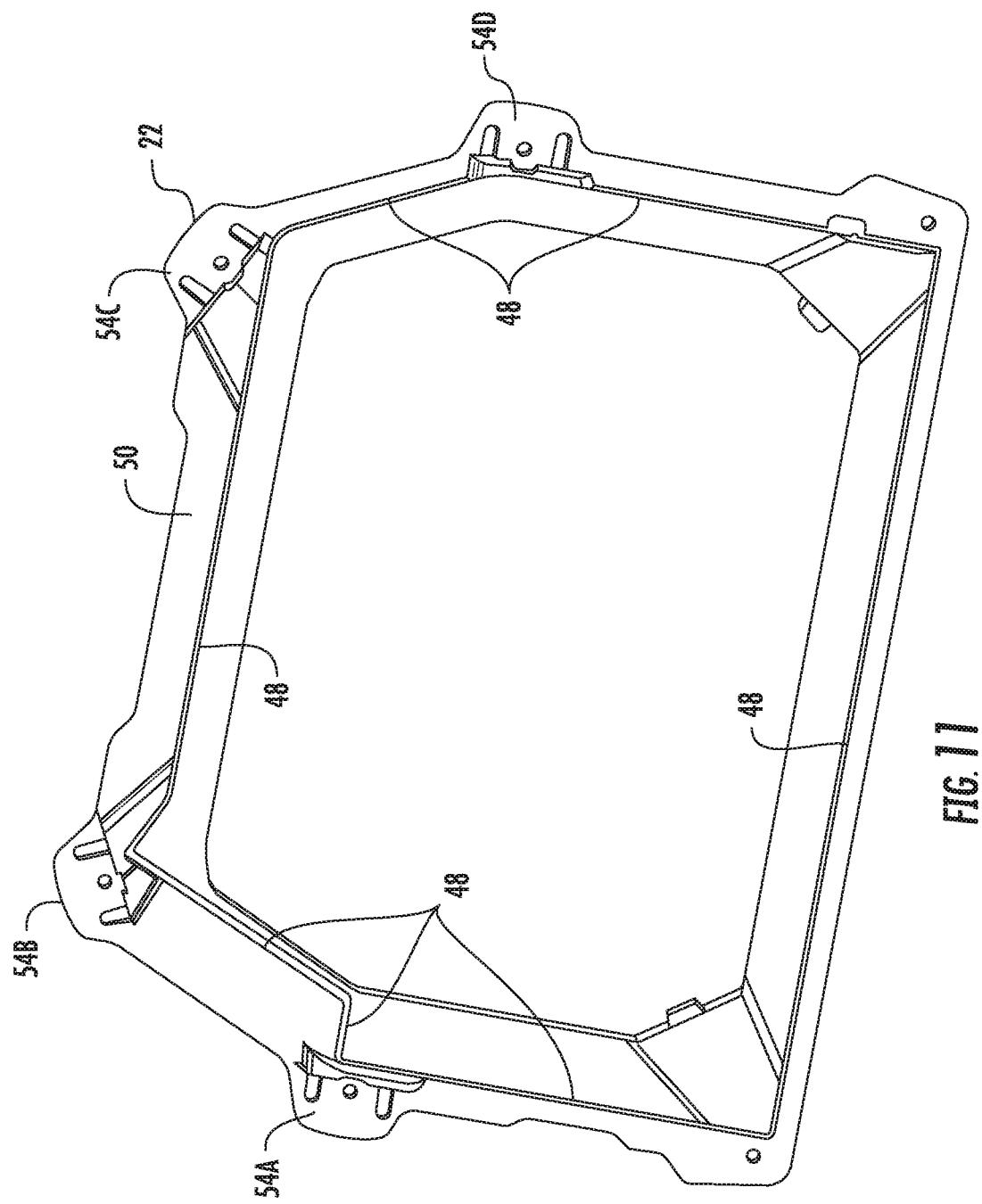
FIG. 11 is an isometric view of an exemplary side frame member of the welding system of FIG. 1.

Referring now to FIGS. 9-12, an exemplary inter-engagement of the elements of the casing 1 will be described in greater detail. As will be explained, the disclosed casing 1 has a framework of elements that interfit in a manner that provides an improved overall structurally stable and rigid enclosure. In some embodiments the top portion 2, front portion 8, rear portion 10 and bottom portion 12 may be formed by one or more sheet metal segments which together form a sheet metal "wrapper" portion of the casing 1. As shown in FIGS. 9 and 10, the respective side members 20, 22 have been removed showing the arrangement of this sheet metal wrapper. As can be seen, the sheet metal wrapper forms first and second perimeter edges 44, 46 that can fit within respective recesses in the first and second side members 20, 22. As can be seen in FIG. 11, a recess 48 is formed in an inside surface 50 of the second side member 22. As will be appreciated, the second perimeter edge 46 (FIG. 9) will fit within this recess 48 in the second side member 22. Although not shown, it will be understood that a similar recess is formed in the inside surface of the first side member 20 (FIG. 10), and this similar recess will receive the perimeter edge 44 of the sheet metal wrapper.

The recesses in the first and second side members 20, 22 serve to lock the sheet metal wrapper (i.e., the top portion 2, front portion 8, rear portion 10 and bottom portion 12 of the casing) in place with respect to the first and second side members 20, 22. To lock the first and second side members 20, 22 together around the sheet metal wrapper, the first, second, third and fourth handle members 14A-D are fit between respective fastening lug portions 52A-D, 54A-D of the first and second side members 20, 22 (FIGS. 3 and 5) and are fixed therebetween by fasteners 56, 58 disposed in respective openings in the fastening lug portions 52A-D, 54A-D and the associated handle members 14A-D. Similarly, first and second foot members 16, 18 are fit between respective foot fastening lug portions 60A, B and 62A, B (FIGS. 3 and 5) of the first and second side members 20, 22, respectively. Fasteners 64, 66 are disposed in respective openings in the foot fastening lug portions 60A, B and 62A, B to fix the first and second foot members 16, 18 between the first and second side members 20, 22. Thus arranged, the handles 14A-D and first and second foot members 16, 18 act as integral stiffening and strengthening members of the overall casing 1.

In some embodiments the side frames, the handle members and the foot members can be made from a high impact strength material, such as high density polyethylene (HDPE).

Figure 2:
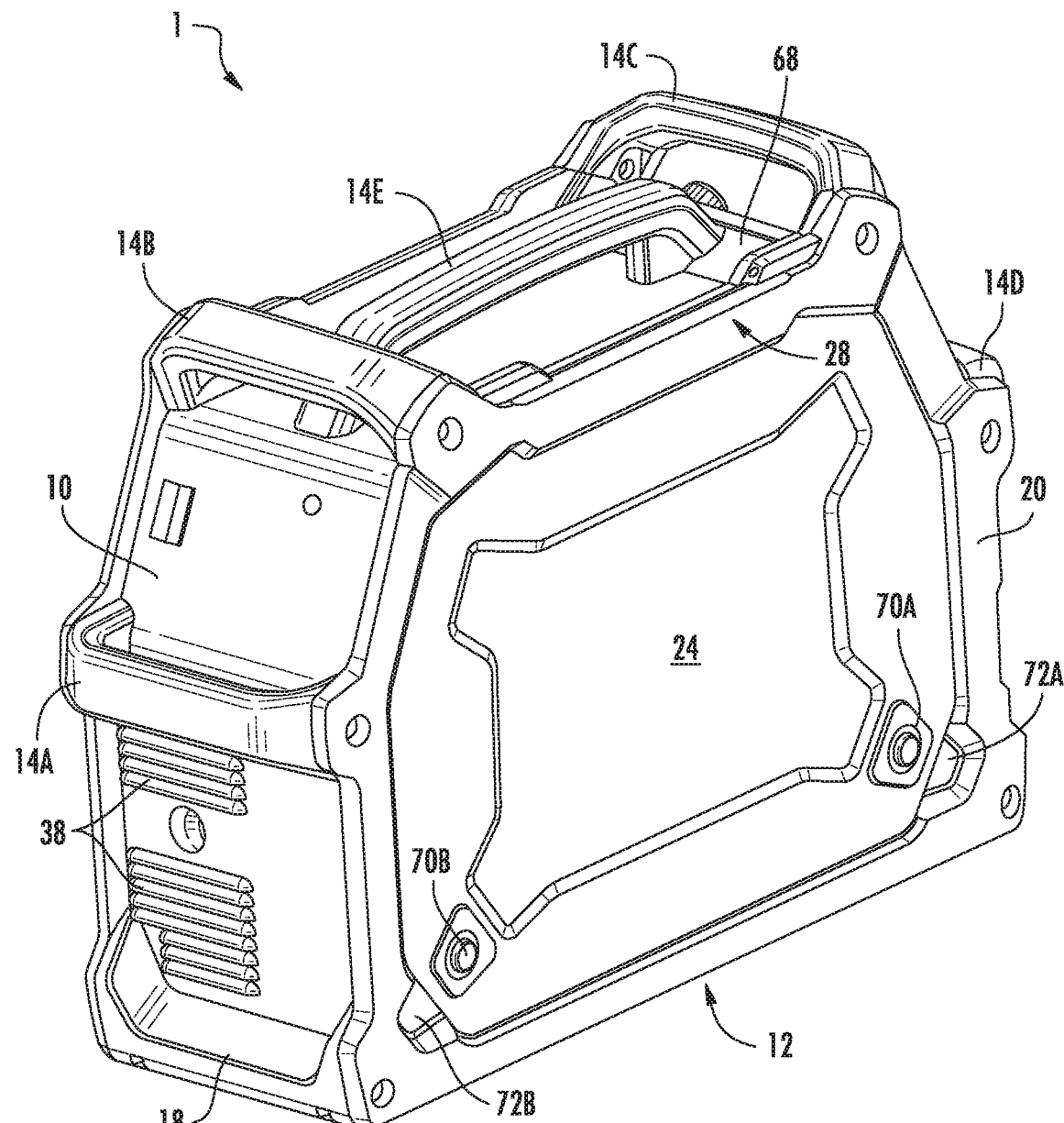
FIG. 2 is a reverse isometric view of the welding system of FIG. 1
Figure 2A:
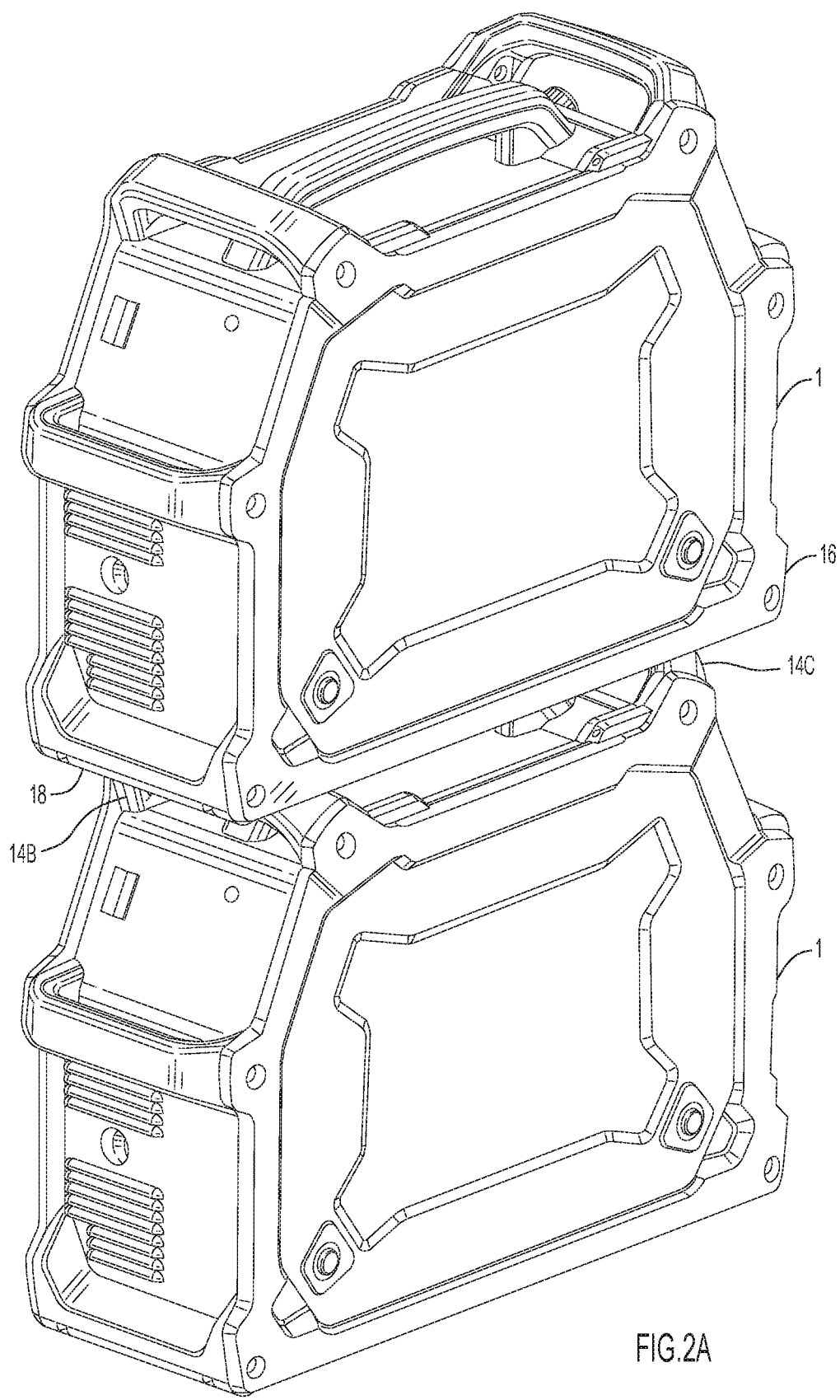
FIG. 2A is a reverse isometric view of a first welding system of FIG. 1 stacked atop a second welding system of FIG. 1.
Figure 6:
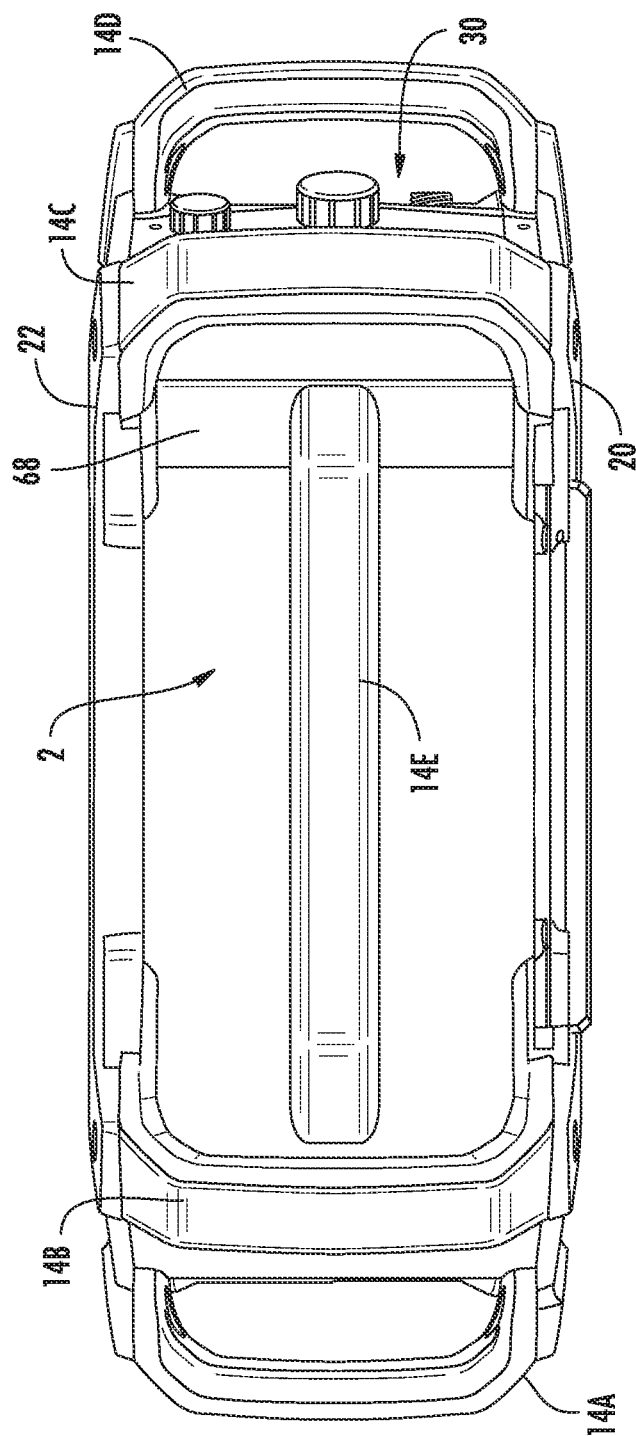
FIG. 6 is a top view of the welding system of FIG. 1.
Figure 7:
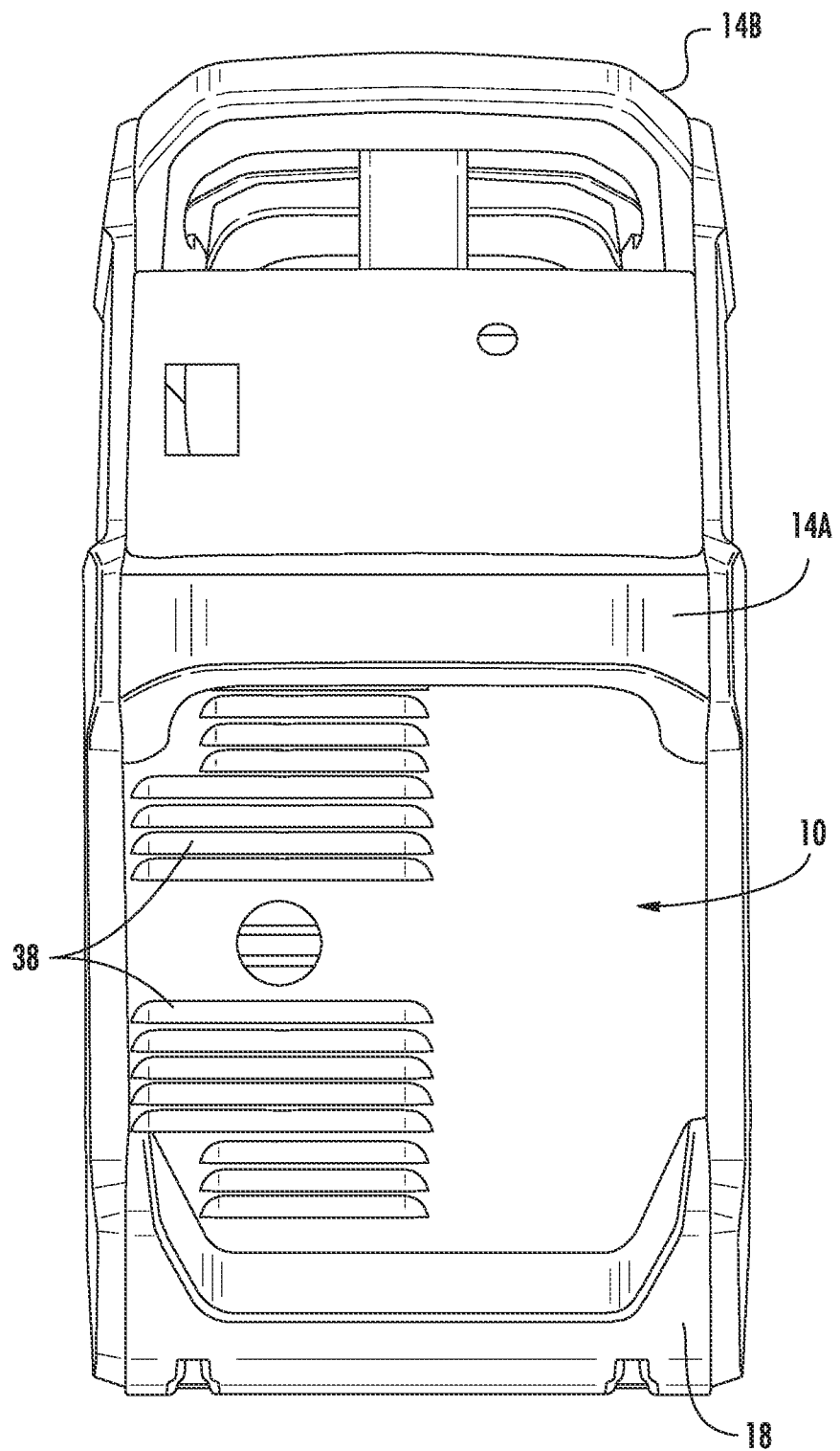
FIG. 7 is a rear view of the welding system of FIG. 1.
Figure 8:
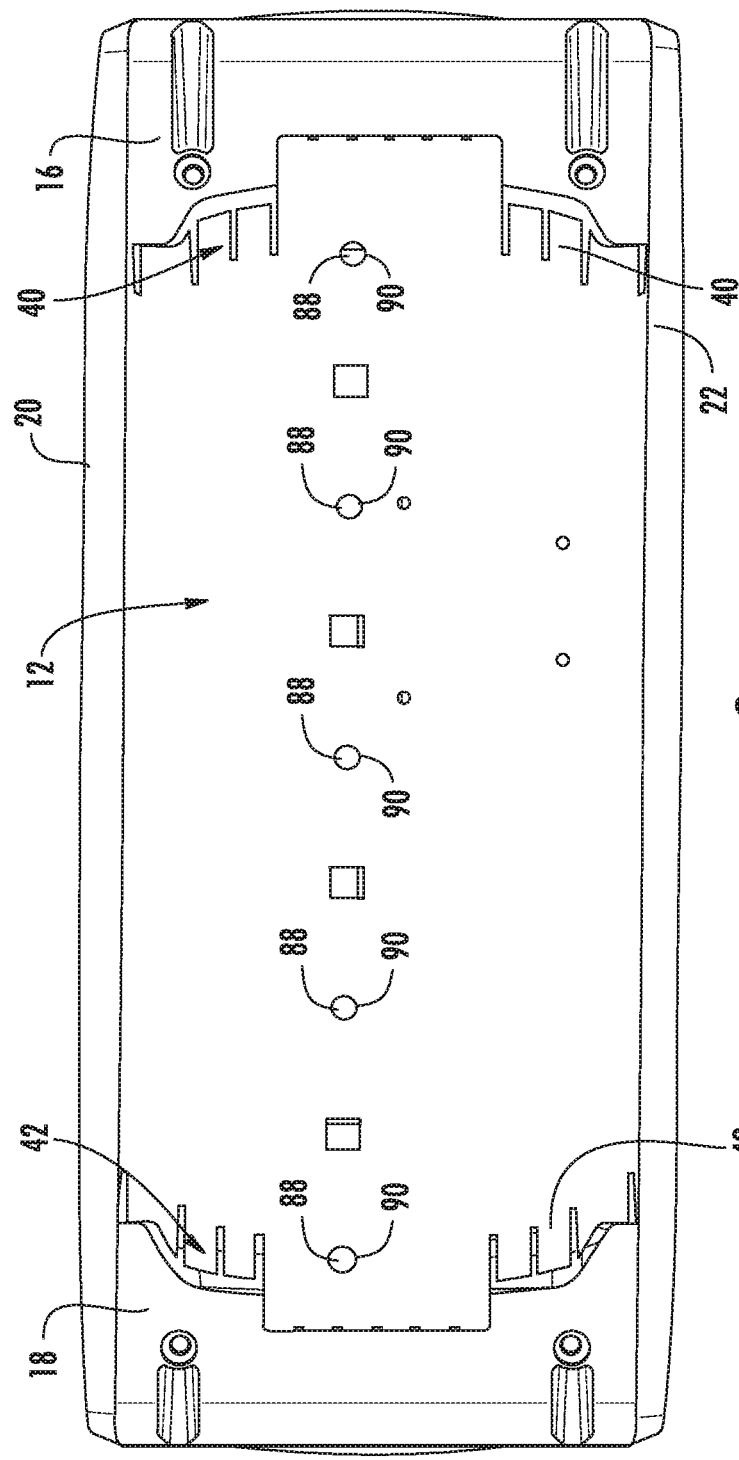
FIG. 8 is a bottom view of the welding system of FIG. 1.

As can be seen best in FIGS. 2, 6 and 9, the top portion 2 of the casing 1 may include an upwardly angled segment 68 positioned directly adjacent to the front portion 8, and more particularly directly adjacent to the user interface 30. This upwardly angled segment 68 rises above the plane of the top portion 2 to prevent materials (e.g., equipment) that may be placed on the top portion 2 from rolling off onto, and causing damage to, the user interface 30. To the extent the casing 1 is subject to water spray or rain, this arrangement also prevents any accumulated water from rolling off the top portion 2 onto the user interface 30. Rather, such water will tend to roll off the opposite end of the top portion 2.

Referring again to FIG. 2, the details of the hinged door arrangement will be described in greater detail. As previously noted, the first side member 20 may have a hinge 28 for pivotably connecting a top end of the first plate member 24 to the first side member 20, thus enabling a user to access the one or more welding components by swinging the first plate member 24 out and away from the housing about the hinge 28. (FIG. 10 shows the hinge 28 without the first side member 20 or the first plate member 24 attached.) The hinge 28 may be rotatably coupled to the first side member 20, and may be fixed to the first plate member 24. Thus arranged, the first plate member 24 can swing into and out of engagement with the first side member 20. To maintain the first plate member 24 in a closed position with respect to the first side member 20, the first plate member may include a pair of push button latches 70A, 70B, configured to catch on respective raised tabs formed behind two recesses 72A, 72B formed at bottom corners of the first side member 20 (tab 71A is visible in FIG. 9, while a similar tab corresponding to recesses 72B is not shown).

Referring again to FIG. 12, the second side member 22 is shown as having a recessed planar section 74 sized and shaped to receive the second plate member 26 (not shown in this view). Furthermore, although not shown, it will be appreciated that first side member 20 has a similar recessed planar section sized and shaped to receive the first plate member 24. This recessed planar section 74 is positioned such that when the second plate member 26 is engaged with the second side member 22, the second plate member 26 is recessed behind the plane of the second side member 22. This recessed arrangement ensures that side impacts to the casing 1 will be less likely to dent or ding the first or second plate members 24, 26. This is particularly true when the first and second plate members 24, 26 are made of metal.

Figure 12:
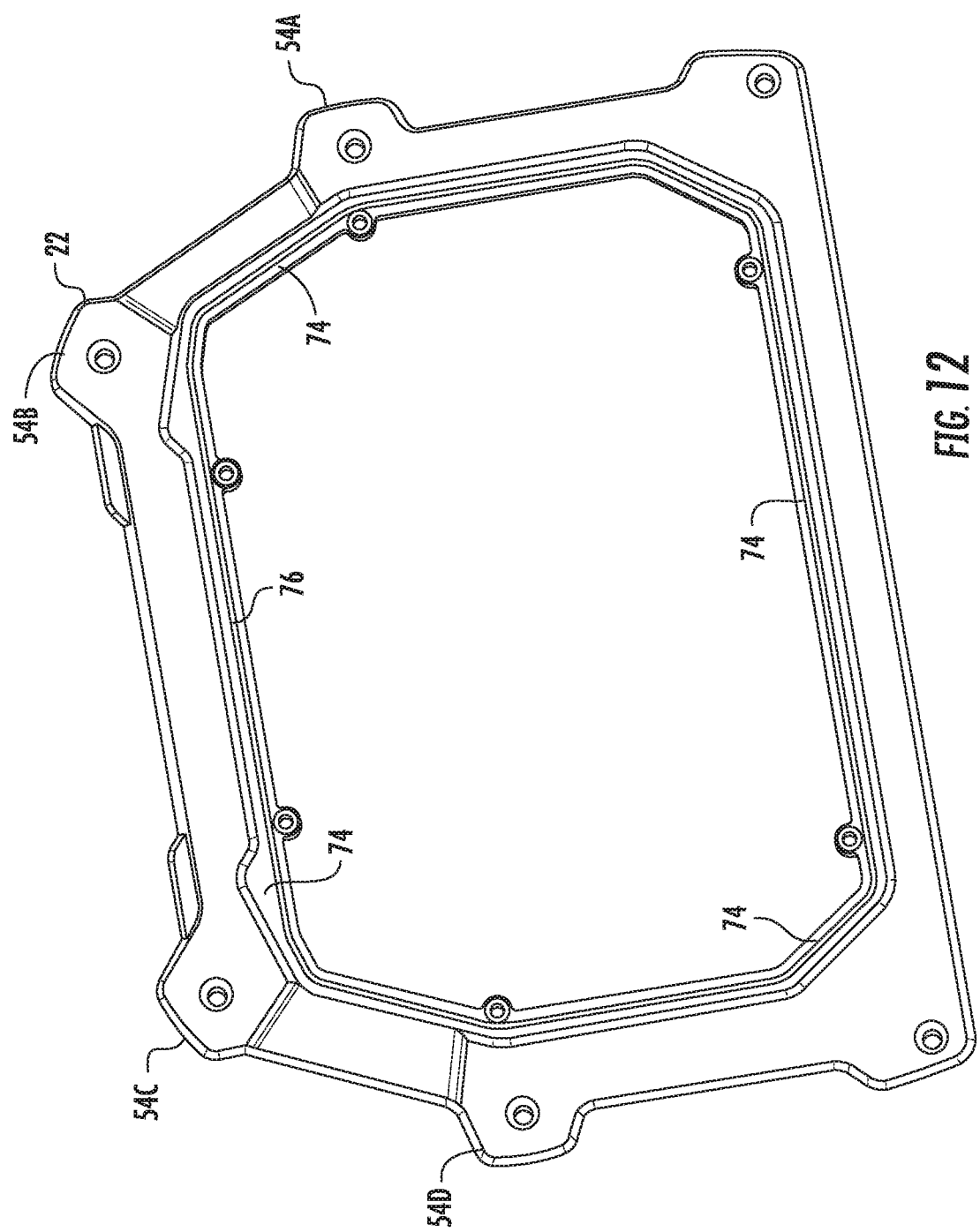
FIG. 12 is a reverse isometric view of the side frame member of FIG. 11.

Also visible in FIG. 12 is a seal recess 76 that runs around the recessed planar section 74 of the second side member 22. This seal recess 76 is configured to receive an appropriate sealing element such as a gasket or o-ring (not shown) that can seal the second plate member 26 to the second side member to prevent intrusion of water past the second plate member and the second side member. It will be appreciated that the first side member 20 includes a similar seal recess for receiving a similar sealing element to prevent intrusion of water past the first plate member 24 and the first side member 20.

In some embodiments, as shown in FIGS. 1, 3, and 5, the first and second plate members 24, 26 may have a recessed portion 78 stamped into the member such that the recessed portion 78 and the remainder of the associated plate member reside in different planes. In the illustrated embodiment this recessed portion forms a general "X" shape, though the particular shape is not critical. This recessed portion, when stamped into the plate member can make the resulting plate member stronger, and can protect graphics that may be formed on the plate members from being damaged.

Figure 13:
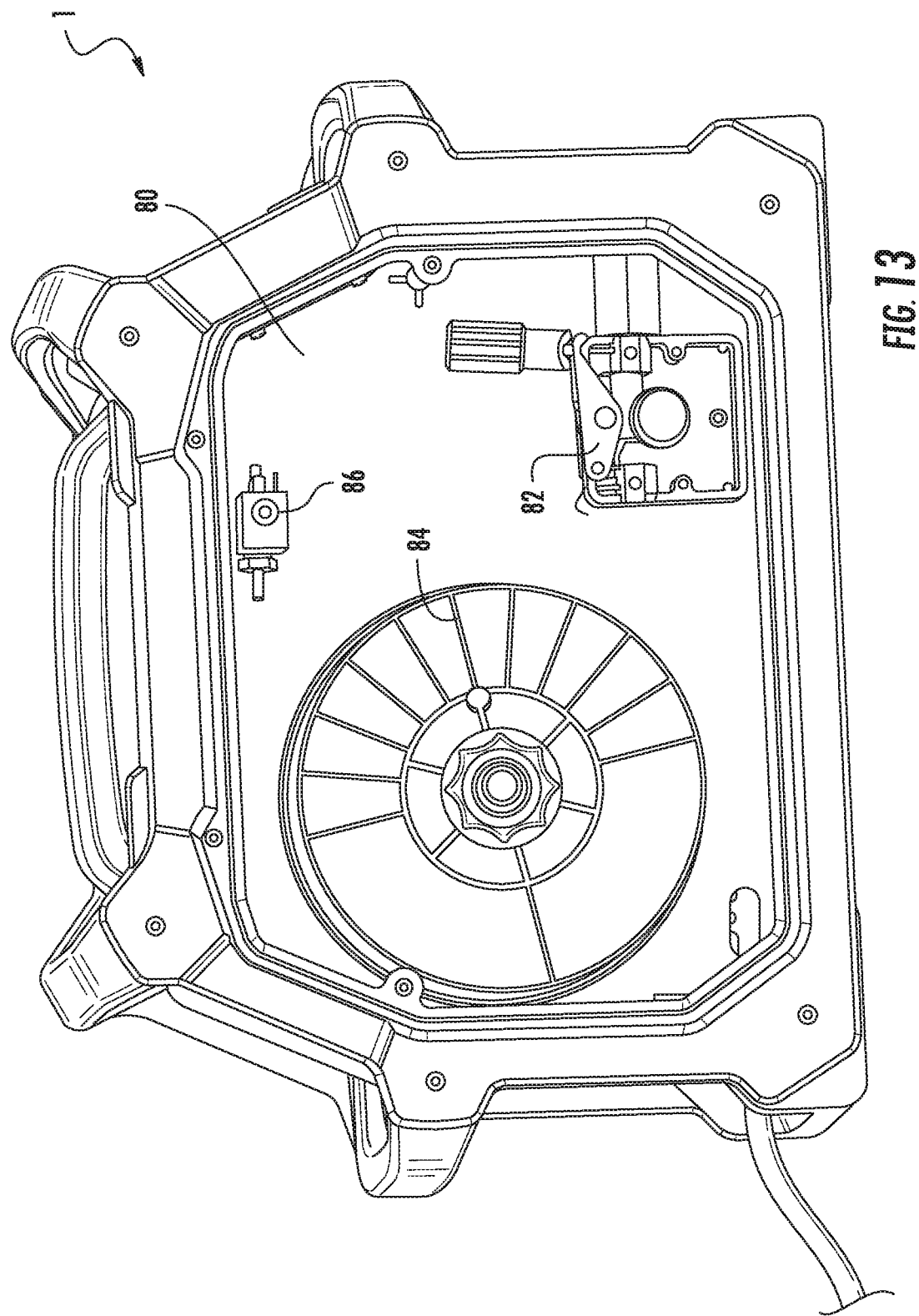
FIG. 13 is an isometric view of the welding system of FIG. 1 with a side portion removed, showing internal components of the system.
Figure 14:
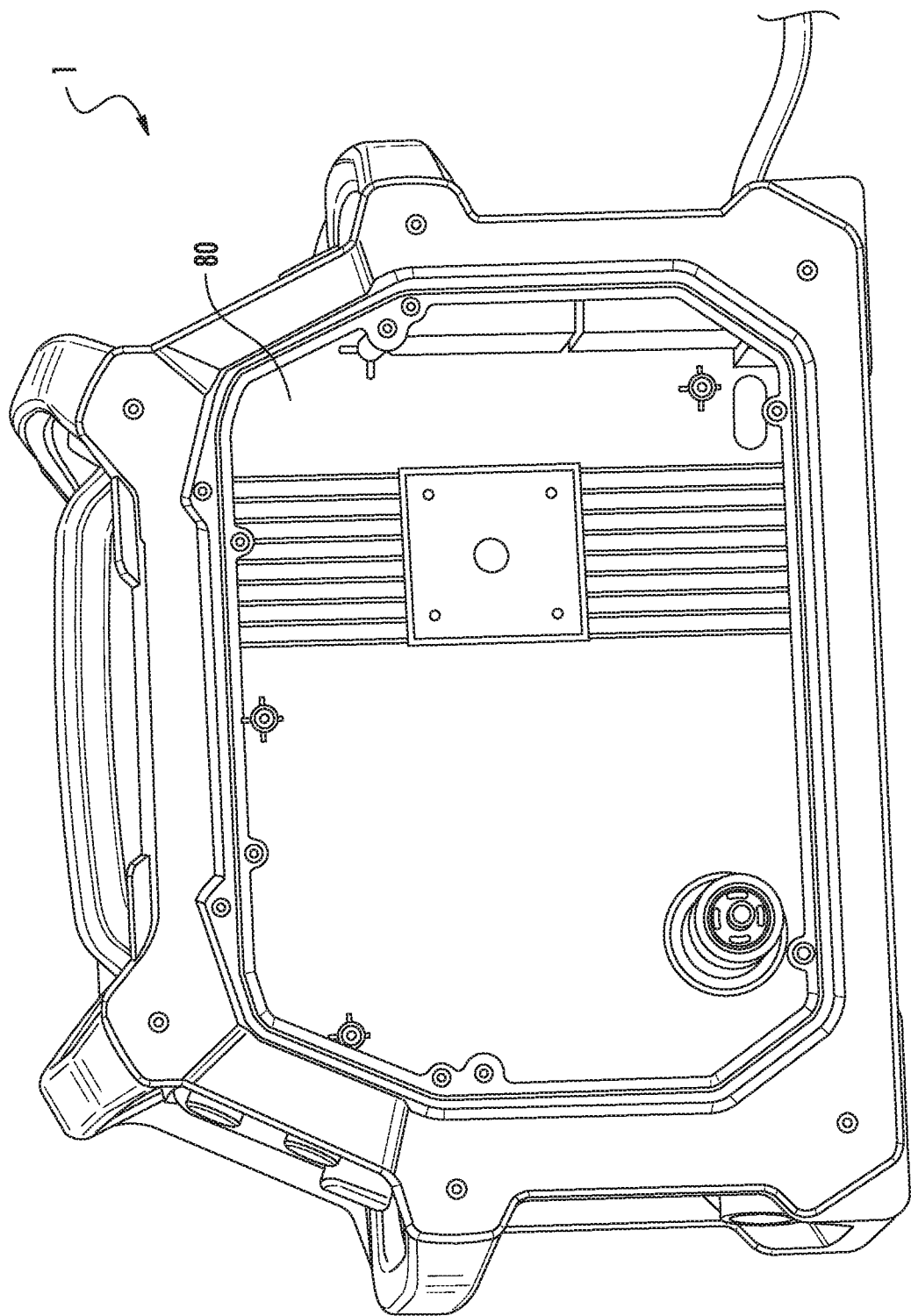
FIG. 14 is a reverse isometric view of the welding system of FIG. 1 with a side portion removed, showing internal components of the system.

Referring now to FIGS. 13 and 14, the casing 1 may include a center divider 80 that can divide the interior of the casing between a portion accessible to the user, and a portion that is generally inaccessible to the user. The portion accessible to the user may include a wire feeder 82, a welding wire spool 84, and gas supply tubing and fittings 86. The portion inaccessible to the user may include thermal management components such as heat sinks, fans and the like. The center divider 80 may have various features such as grooves (not shown) for guiding a gas hose and/or for holding a solenoid in a desired location.

An outside shape of the center divider 80 generally conforms to the shape of the sheet metal wrapper so that the center divider supports the sheet metal wrapper. A bottom edge of the center divider may include a plurality of protrusions 88 (FIG. 8) that are received through associated openings 90 in the bottom portion 12 of the casing. Speed nuts or other appropriate fasteners (not shown) may self-thread onto the protrusions 88, to lock the bottom of the center divider 80 to the bottom portion 12 of the casing. At the top of the center divider 80, a bracket (not shown) may be provided beneath the fifth handle member 14E and may lock the center divider 80 through the bracket and into the fifth handle member. Thus arranged, the center divider 80 provides additional structural stiffness and rigidity to the casing 1. One or more surface features (e.g., ribs, protrusions) may be provided on the center divider 80 to enhance rigidity in an overall fashion or a discrete localized fashion.

Figure 15:
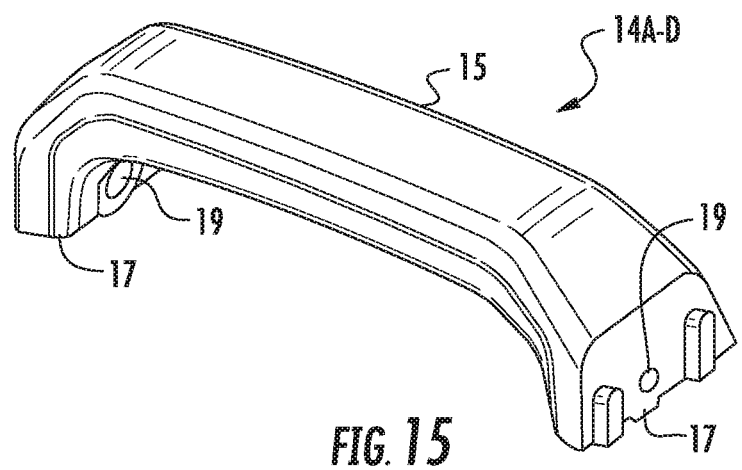
FIGS. 15-17 are isometric views of an exemplary handle of the welding system of FIG. 1.
Figure 16:
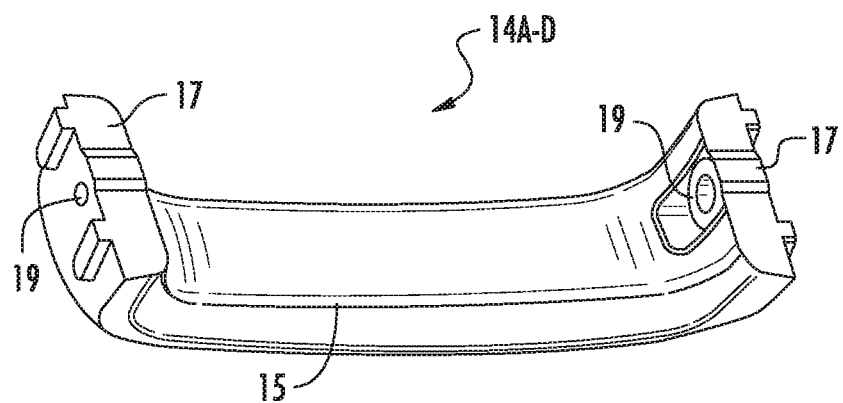
Figure 17:
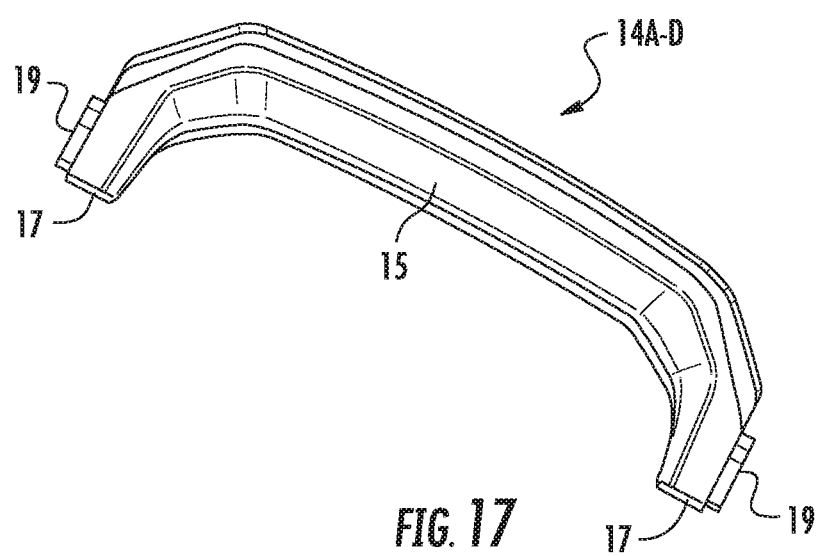

FIGS. 15-17 show detail views of a handle member which may be suitable for use as one of the first, second, third or fourth handle members 14A-D previously described. As noted, the first, second, third and fourth handle members 14A-D may all be of the same design to enable easy manufacture and/or replacement, as necessary. The handles 14A-D may have a gripping portion 15 and a pair of attachment portions 17 which, as previously described, may each have an opening 19 suitable for receiving a fastener therein to lock the handle in place between the first and second side members 20, 22. The attachment portions 17 of the handle members 14A-D may include an angled protrusion that fits within a correspondingly shaped recess in the first or second side members 20, 22. These angled protrusions serve to locate the handles 14A-D with respect to the side members 20, 22, and can also provide enhanced rotational and structural stability to the overall handle assembly.

Figure 18:
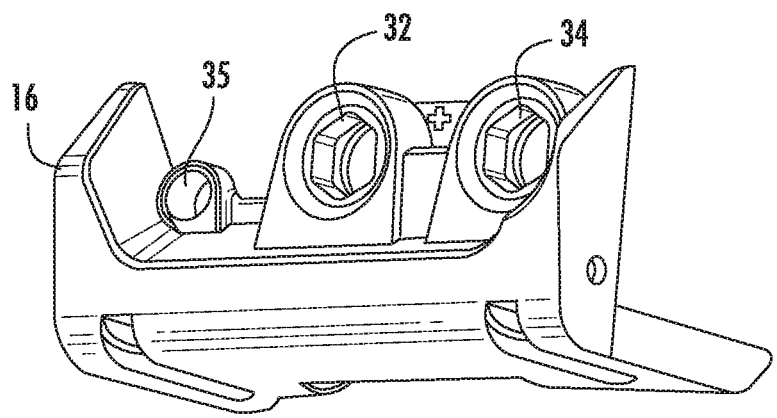
FIGS. 18-20 are isometric views of exemplary foot elements of the welding system of FIG. 1.
Figure 19:
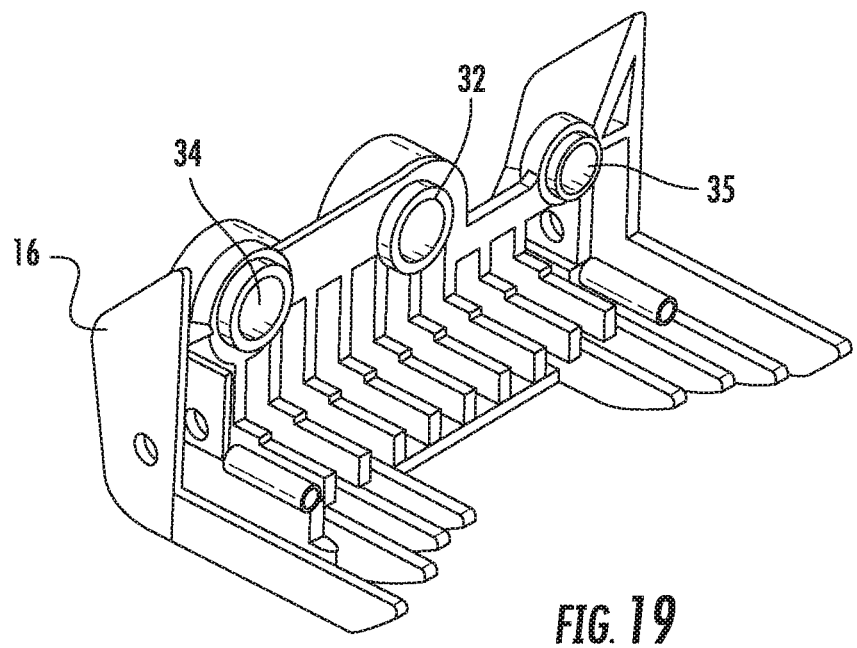
Figure 20:
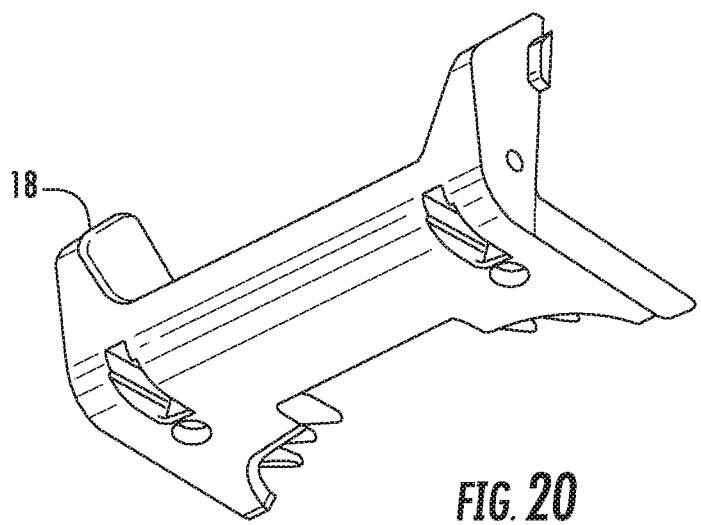

FIGS. 18-20 illustrate the first and second foot members 16, 18 in greater detail. As previously noted, the first and second foot members 16, 18 may each have an L-shape so as to cradle the associated front or rear portion 8, 10 of the casing 1. The first foot member 16 includes a plurality of openings 32, 34 to correspond with operational connection points of the casing 1.

As with the handle members 14A-D, the first and second foot members 16, 18 may be fixable to the casing 1 using suitable fasteners (not shown). The result is a readily replaceable set of foot members 16, 18 that can be easily changed if damaged. Alternatively, the first and second foot members 16, 18 could be removed and replaced with a bottle bracket, wheel assembly or other utility.

In the illustrated embodiment, the openings 32, 34 in the first foot member 16 correspond to OKC connections of the casing 1. An additional an opening 35 may be employed for an electrical cable (not shown) to extend therefrom. The electrical cable may extend out of the additional opening 35, whereupon the user can selectively engage a connector portion of the wire with a socket disposed within or behind one of the plurality of openings 32, 34. In one non-limiting exemplary embodiment, one of the openings 32 can be associated with a positive OKC connection, while the other of the openings 34 can be associated with a negative OKC connection. Since both openings 32, 34 are located in the same side of the additional opening 35, the natural twist of the electrical cable may be exploited so as to tend to tighten the ultimate connection. This is an improvement over prior designs in which the positive and negative connections are located on opposite sides of the cable opening. With such prior designs, the cable may naturally twist tight when coupled to one connector, but may naturally tend to twist loos when coupled to the other connector.

Figure 21:
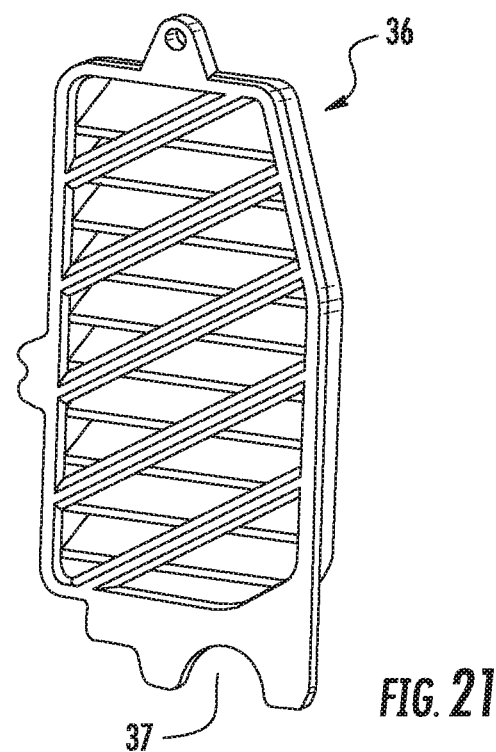
FIGS. 21 and 22 are isometric views of an exemplary louver member of the welding system of FIG. 1.
Figure 22:
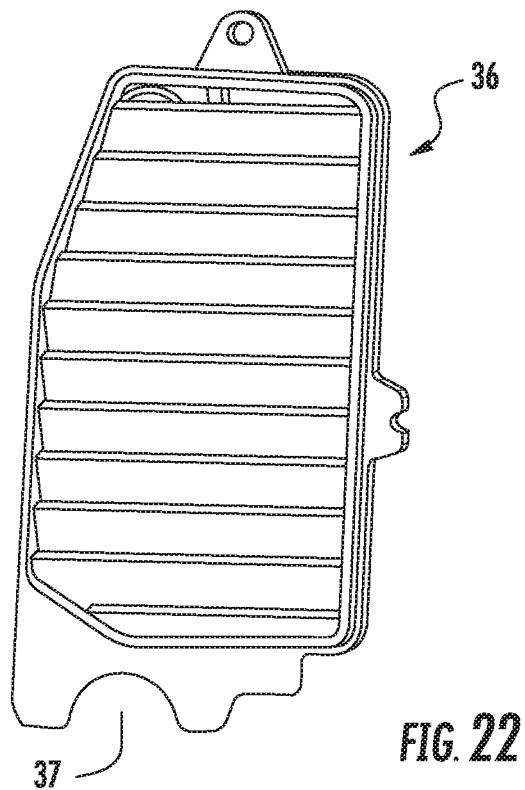

An exemplary front louver 36 is shown in FIGS. 21 and 22. As can be seen, the front louver 36 is an angled louver element configured to be positioned behind the louver opening in the front portion 8 of the casing 1. The front louver 36 may include at least one cutout 37 positioned on a lower edge thereof. The cutout 37 may correspond to one of the plurality of openings 32, 34 in the first foot member 16 (FIGS. 18-19) to accommodate a connector therebetween.

Based on the foregoing information, it will be readily understood by those persons skilled in the art that the invention is susceptible of broad utility and application. Many embodiments and adaptations of the invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the invention has been described herein in detail in relation to its preferred embodiment, it is to be understood that this disclosure is only illustrative and exemplary of the present invention and is made merely for the purpose of providing a full and enabling disclosure of the invention. The foregoing disclosure is not intended to be construed to limit the invention or otherwise exclude any such other embodiments, adaptations, variations, modifications or equivalent arrangements; the invention being limited only by the claims appended hereto and the equivalents thereof. Although specific terms are employed herein, they are used in a generic and descriptive sense only and not for the purpose of limitation.

What is claimed is:

1. A portable welding system casing, comprising:
   a unitary wrapper including a front portion, a rear portion, a top portion and a bottom portion that collectively define a first perimeter edge and a second perimeter edge opposite the first perimeter edge;
   a first side member with a first plurality of fastening lug portions and an inner surface with a first recess that receives the first perimeter edge of the unitary wrapper;

a second side member with a second plurality of fastening lug portions and an inner surface with a second recess that receives the second perimeter edge of the unitary wrapper;

a plurality of handle members, each of the plurality of handle members coupled between a first fastening lug portion of the first plurality of fastening lug portions and a second fastening lug portion of the second plurality of fastening lug portions;

an additional handle member that is directly connected to the top portion of the unitary wrapper and that extends perpendicular to each of the plurality of handle members;

a first foot member attached to the front portion to the bottom portion and horizontally extending across the front portion; and a second foot member attached to the rear portion to the bottom portion and horizontally extending across the rear portion, wherein the plurality of handle members include:

a first handle member of the plurality of handle members that horizontally extends across a first end of the top portion of the unitary wrapper;

a second handle member of the plurality of handle members that horizontally extends across a second end of the top portion of the unitary wrapper, the first end being opposite the second end;

wherein the first foot member has a first engagement recess formed in a first bottom portion of the first foot member, the second foot member has a second engagement recess formed in a second bottom portion of the second foot member, wherein the first engagement recess and the second engagement recess are each shaped to conform to and receive an upper surface of each of the first handle member and the second handle member of the plurality of handle members such that the portable welding system casing is configured to be stacked on top of another portable welding system casing.

2. The portable welding system casing of claim 1, wherein the plurality of handle members comprise:

a third handle member that extends across the front portion of the unitary wrapper; and a fourth handle member that extends across the rear portion of the unitary wrapper so that outer surfaces of the plurality of handle members form a protective perimeter around the unitary wrapper.

3. The portable welding system casing of claim 2, wherein the second handle member and the fourth handle member are positioned adjacent to a user interface of the portable welding system casing to provide a protective barrier for the user interface.

4. The portable welding system casing of claim 1, wherein the plurality of handle members each have a same design.

5. The portable welding system casing of claim 1, further comprising:

a center divider coupled to the top portion and the bottom portion, the center divider having a shape that conforms to the front portion, the rear portion, the top portion and the bottom portion so that the center divider supports the front portion, the rear portion, the top portion, and the bottom portion.

6. The portable welding system casing of claim 5, wherein the center divider includes a plurality of protrusions and the bottom portion includes a plurality of openings configured to receive the plurality of protrusions to fix the center divider to the bottom portion.

7. The portable welding system casing of claim 1, wherein the top portion has an upwardly angled segment positioned directly adjacent to the front portion.

8. The portable welding system casing of claim 1, further comprising:

a first plate member that is coupled to the first side member and recessed below a first plane defined by the first side member; and a second plate member that is coupled to the second side member and recessed below a second plane defined by the second side member, wherein:

the first plate member has a first recessed portion residing in a different plane than a remainder of the first plate member, and the second plate member has a second recessed portion residing in a different plane than a remainder of the second plate member.

9. The portable welding system casing of claim 8, further comprising at least one of:

a first hinged connection between the first plate member and the first side member; and a second hinged connection between the second plate member and the second side member.

10. A portable welding system casing, comprising:

a wrapper including a front portion, a rear portion, a top portion and a bottom portion that collectively define a first perimeter edge and a second perimeter edge opposite the first perimeter edge;

a first side member with a first plurality of fastening lug portions and an inner surface that receives the first perimeter edge of the wrapper;

a second side member with a second plurality of fastening lug portions and an inner surface that receives the second perimeter edge of the wrapper;

a plurality of handle members, each of the plurality of handle members coupled between a first fastening lug portion of the first plurality of fastening lug portions and a second fastening lug portion of the second plurality of fastening lug portions;

a first foot member attached to the front portion to the bottom portion and horizontally extending across the front portion; and a second foot member attached to the rear portion and to the bottom portion and horizontally extending across the rear portion, wherein:

at least one first handle member of the plurality of handle members horizontally extends across the front portion between a first section of the front portion that includes a user interface and a second section of the front portion that vertically separates the at least one first handle member from the first foot member;

at least one second handle member of the plurality of handle members horizontally extends across the rear portion while being vertically separated from the second foot member; and at least two third handle members of the plurality of handle members horizontally extend across opposite ends of the top portion respectively, the at least two third handle members being vertically separated from the at least one first handle member and the at least one second handle member respectively.

11. The portable welding system casing of claim 10, further comprising:
- a first plate member that is coupled to the first side member and recessed below a first plane defined by the first side member; and
- a second plate member that is coupled to the second side member and recessed below a second plane defined by the second side member, wherein:
- the first plate member has a first recessed portion residing in a different plane than a remainder of the first plate member, and
- the second plate member has a second recessed portion residing in a different plane than a remainder of the second plate member.

12. The portable welding system casing of claim 11, further comprising at least one of:
- a first hinged connection between the first plate member and the first side member; and
- a second hinged connection between the second plate member and the second side member.

13. The portable welding system casing of claim 10, wherein:
- one handle member of the at least two third handle members is associated with the front portion of the wrapper, and
- another handle member of the at least two third handle members is associated with the rear portion of the wrapper so that outer surfaces of the plurality of handle members form a protective perimeter about the wrapper.

14. The portable welding system casing of claim 13, wherein:
- the first section of the front portion is angled with respect to both the top portion and the second section of the front portion of the wrapper so that the user interface is oriented at an angle with respect to the top portion and the second section of the front portion of the wrapper; and
- outer surfaces of the at least one first handle member and the one handle member of the at least two third handle members provide a protective barrier for the user interface, wherein:
- an outer edge of the protective barrier is also oriented at the angle with respect to the plane aligned with the bottom portion of the wrapper.

15. The portable welding system casing of claim 10, further comprising:
- a center divider coupled to the top portion and the bottom portion, the center divider having a shape that conforms to the front portion, the rear portion, the top portion and the bottom portion so that the center divider supports the front portion, the rear portion, the top portion and the bottom portion, and wherein the center divider includes a plurality of protrusions and the bottom portions includes a plurality of openings configured to receive the plurality of protrusions to fix the center divider to the bottom portion.

16. A casing, comprising:
- a unitary wrapper portion configured to enclose one or more welding components;
- a first side member having:
  - an inner side that defines a first recess that receives a first perimeter edge of the unitary wrapper portion;
  - an outer side opposite the inner side; and
  - a first plate member that is entirely inwardly recessed with respect to a first plane defined by the outer side of the first side member, and includes a first recessed portion residing in a different plane than both the first plane and a remainder of the first plate member;
- a second side member having:
  - an inner side that defines a second recess that receives a second perimeter edge of the unitary wrapper portion;
  - an outer side opposite the inner side of the second side member; and
  - a second plate member that is entirely inwardly recessed with respect to a second plane defined by the outer side of the second side member, and includes a second recessed portion residing in a different plane than both the second plane and a remainder of the second plate member; and
- a plurality of handle members, each of the plurality of handle members coupled between the first side member and the second side member.

17. The casing of claim 16, wherein the plurality of handle members extend away from the casing to provide a protective barrier, and wherein:
- a first handle member and a second handle member of the plurality of handle members extend across a rear portion of the unitary wrapper portion; and
- a third handle member and a fourth handle member of the plurality of handle members extend across a front portion of the unitary wrapper portion.

18. The casing of claim 17, further comprising:
- a first foot member coupled to the unitary wrapper portion; and
- a second foot member coupled to the unitary wrapper portion, wherein:
- a first vertical distance between the first handle member and the first foot member is equal to a second vertical distance between the fourth handle member and the second foot member.

19. The casing of claim 16, further comprising at least one of:
- a first hinged connection between the first plate member and the first side member;
- a second hinged connection between the second plate member and the second side member; and
- a center divider coupled to the unitary wrapper portion, the center divider having a shape that conforms to a shape of the unitary wrapper portion so that the center divider supports the unitary wrapper portion.

* * * * *